(12) United States Patent
Spivak

(10) Patent No.: US 10,308,330 B1
(45) Date of Patent: Jun. 4, 2019

(54) MOTION STABILIZED SPOTLIGHT

(71) Applicant: Paul Spivak, Eastlake, OH (US)

(72) Inventor: Paul Spivak, Eastlake, OH (US)

( * ) Notice: Subject to any disclaimer, the term of this patent is extended or adjusted under 35 U.S.C. 154(b) by 332 days.

(21) Appl. No.: 15/417,341

(22) Filed: Jan. 27, 2017

(51) Int. Cl.
| | |
|---|---|
| *B63B 45/02* | (2006.01) |
| *B63B 49/00* | (2006.01) |
| *F21V 21/15* | (2006.01) |
| *F21V 21/30* | (2006.01) |
| *G05B 15/02* | (2006.01) |
| *G01C 17/00* | (2006.01) |
| *F21Y 115/10* | (2016.01) |
| *B63B 45/00* | (2006.01) |
| *F21W 107/20* | (2018.01) |

(52) U.S. Cl.
CPC .............. *B63B 45/02* (2013.01); *B63B 49/00* (2013.01); *F21V 21/15* (2013.01); *F21V 21/30* (2013.01); *G05B 15/02* (2013.01); *B63B 2045/005* (2013.01); *B63B 2213/00* (2013.01); *F21W 2107/20* (2018.01); *F21Y 2115/10* (2016.08)

(58) Field of Classification Search
CPC ......... B63B 45/00; B63B 45/02; B63B 49/00; F21V 21/00; F21V 21/15; F21V 21/30; G05B 15/00; G05B 15/02; G01C 17/00; G01C 17/14; G01S 13/00; G01S 13/04; G01S 13/06; G01S 13/08; G01S 13/9307
See application file for complete search history.

(56) References Cited

U.S. PATENT DOCUMENTS

| | | | | |
|---|---|---|---|---|
| 8,009,191 | B2* | 8/2011 | Skjelten | G01S 7/22 348/113 |
| 9,615,006 | B2* | 4/2017 | Terre | G08B 13/1963 |
| 2009/0260511 | A1* | 10/2009 | Melnychuk | F41G 3/147 89/1.11 |
| 2012/0224063 | A1* | 9/2012 | Terre | G08B 13/1963 348/148 |
| 2015/0341532 | A1* | 11/2015 | Terre | G08B 13/1963 348/376 |
| 2016/0162145 | A1* | 6/2016 | Rivers | G01S 13/9307 715/769 |
| 2017/0176586 | A1* | 6/2017 | Johnson | G01C 17/38 |
| 2017/0363391 | A1* | 12/2017 | Conklin | F41G 5/14 |
| 2018/0107210 | A1* | 4/2018 | Harnett | G05D 1/0038 |

* cited by examiner

*Primary Examiner* — Yonel Beaulieu
(74) *Attorney, Agent, or Firm* — Dominic A. Frisina

(57) ABSTRACT

A spotlight apparatus is provided have an illumination element rotationally and pivotally mounted to a pedestal. A vertical control motor urges the illumination housing up and down. A lateral control motor urges the illumination element left or right. A joystick input provides manual directional control of the vertical motor and lateral motor. A MEMS gyroscope or similar microelectronic controller provides an automated control input that, when activated, provides a continuous control signal for providing vertical and lateral motor control based upon a target set point selected by the user.

3 Claims, 5 Drawing Sheets

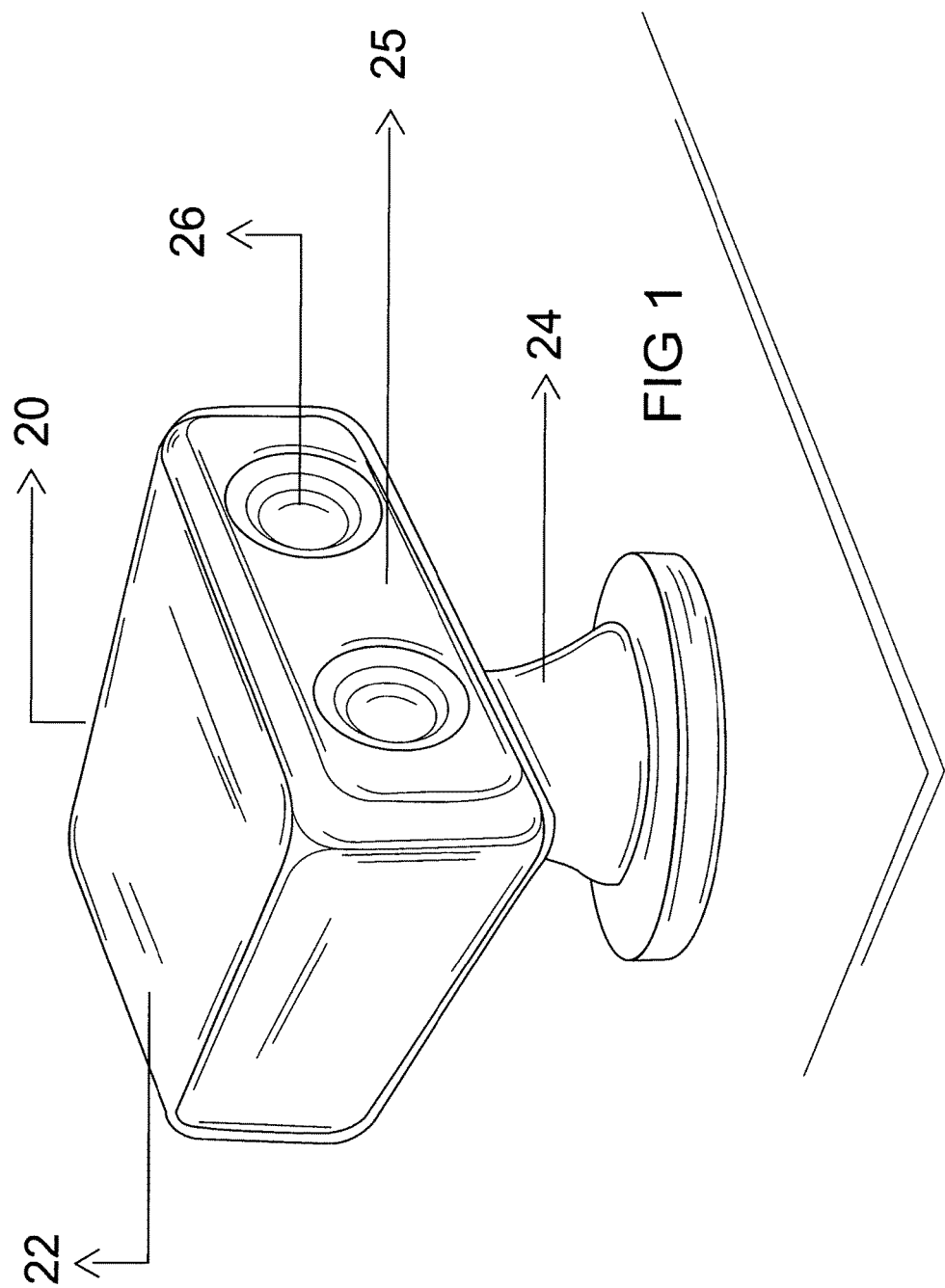

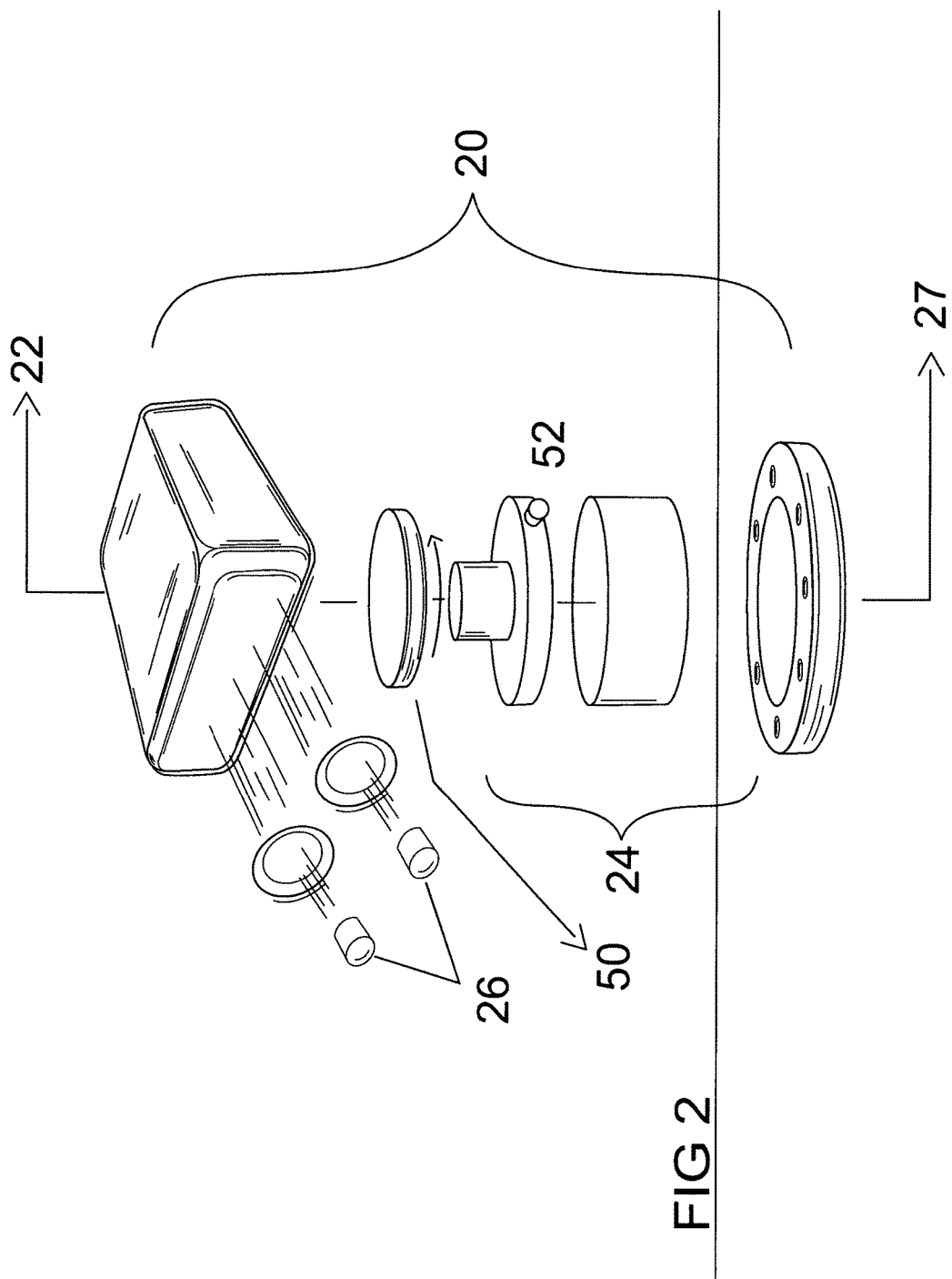

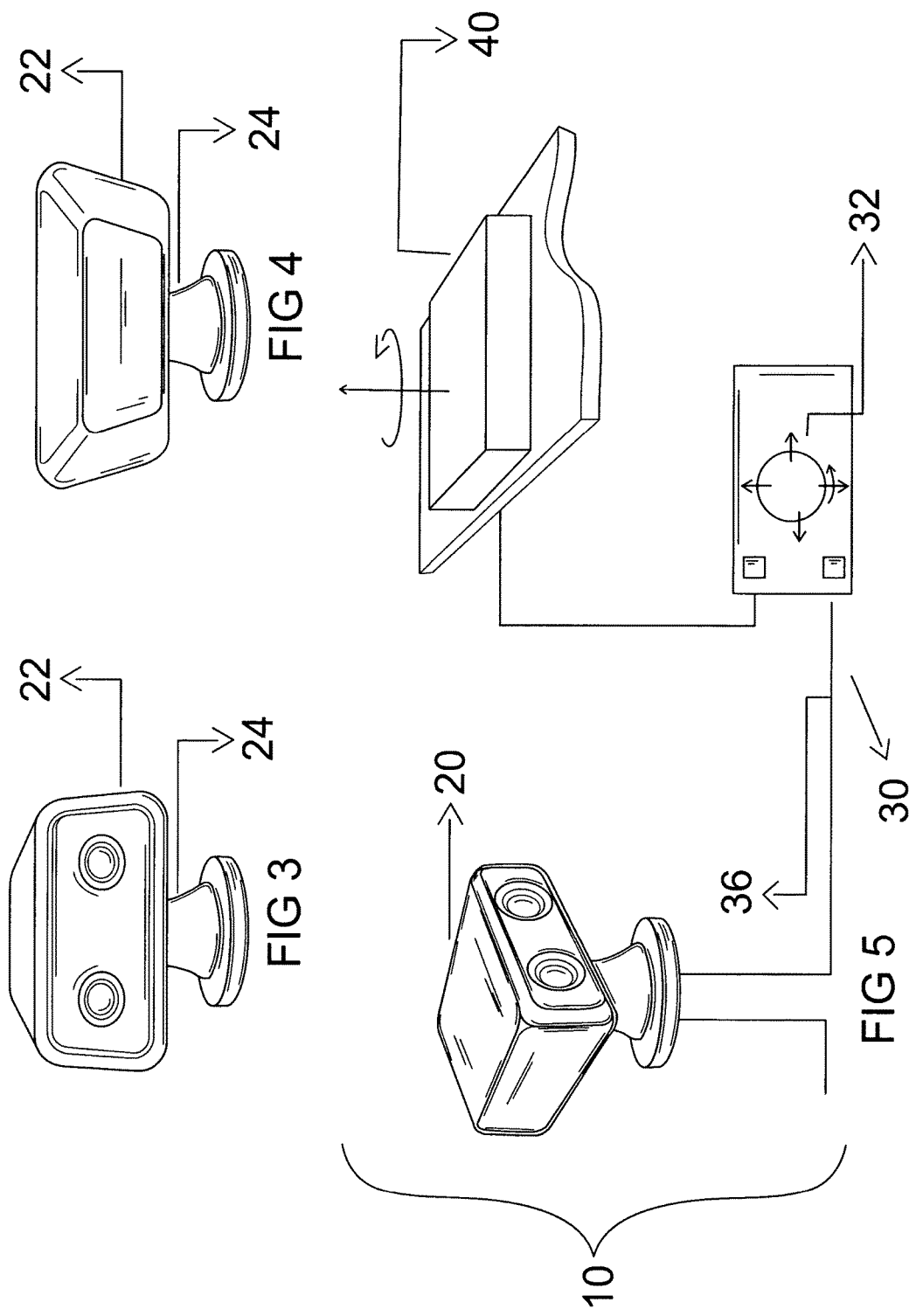

MOTION STABILIZED SPOTLIGHT

RELATED APPLICATIONS

There are no previously filed, nor currently any co-pending applications, anywhere in the world.

BACKGROUND OF THE INVENTION

1. Field of the Invention

The field of invention relates to boat mounting spotlight or searchlight apparatus, and more particularly, to such a boat-mounted spotlight apparatus that is capable of both remote control operation as well as autonomous select target tracking.

2. Description of the Related Art

Search lights, spot lights and similar target illumination devices currently exist for use with maritime use. Typical of such lighting arrangements include a pedestal mounted light housing having directional control laterally (usually 360 degree rotation) and vertically (usually +/−45 degrees pivoting from horizontal). In maritime application such lights can have a general use, but are particularly beneficial to target and illuminate objects being approached, either on shore or in or under the water.

Such illuminations systems have existed for some time. One long felt problem that remains unaddressed exists when using a spotlight function to target an object when mounted to a moving platform such as a boat. When on the water, and particularly in rough seas, even when acquired the target can continue to move up and down relative to the light. Even in relatively calm waters, once a user locates the object relative to lateral and vertical axes of the light housing, a user must continue to manipulate the light almost constantly in order to maintain illumination on the desired target.

Examples of prior art running and spot light structure for use in boats is exemplified in the U.S. Pat. No. 4,884,173 to Cassidy wherein a bracket structure is arranged for the fixed mounting of a spotlight relative to a running light of an associated boat structure.

Examples of portable light apparatus of various types are exemplified in the U.S. Pat. No. 4,228,489 to Martin; U.S. Pat. No. 2,165,562 to Mack, et al.; and U.S. Pat. No. 3,833,800 to Stewart, et al. in various situations of portable light structure.

Of specific relevance is U.S. Pat. No. 5,142,457 to Wehner for a boat spotlight apparatus. Such a spotlight apparatus is arranged for mounting to a stern or bow boat socket, and includes a base portion directed into the socket, with an upper handle removably mounted to the socket for use with the organization as a running light or spotlight relative to the boat structure. The base includes a receptacle cooperative with an adapter plug for in conjunction with a cigarette lighter of the boat as a power source.

Whiles these and other marine searchlight devices are known and available, it should be appreciated that there continues to be a need for a new and improved boat spotlight apparatus as set forth by the instant invention which addresses both the main problem of automatically maintaining illumination trained onto a selected target regardless of the yaw, pitch, roll, sway, surge or heave of the board as well as including various other improvements directed towards ease and effectiveness of use and function.

SUMMARY OF THE INVENTION

In view of the foregoing disadvantages inherent in the known types of boat lighting apparatus now present in the prior art, the present invention provides a boat spotlight apparatus wherein the same is arranged for the selective mounting of the apparatus onto a vehicle, and especially a marine vehicle. As such, the general purpose of the present invention, which will be described subsequently in greater detail, is to provide a new and improved boat spot light apparatus which has all the advantages of the prior art boat lighting apparatus and none of the disadvantages.

To attain this, the present invention provides a spotlight apparatus arranged for mounting to a boat and includes a base portion for fixturing to the boat at the deck or above, and further includes an illumination element within a housing. The illumination housing is rotationally and pivotally mounted to the apex of the base portion. A vertical control motor urges the illumination housing, and its contained illumination element, up and down relative to the base portion. A lateral control motor urges the illumination housing, and its contained illumination element, left or right relative to the base portion. A user control inputs for providing manual directional control of the vertical motor and lateral motor is provided in the form of a joystick type controller. An automated control input, when activated, provides a continuous control signal for providing vertical and lateral motor control based upon a target set point selected by the user. A 3D orientation sensor mounted at a known position relative to the illumination housing provides a continuous control reference signal for identifying the overall motion of the boat. A MEMS gyroscope or similar microelectronic controller is utilized to modify a control signal such as to move the spotlight in relation to the motion of the vessel in order to track the intended target regardless of motion imparted by marine conditions.

The present invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved boat spotlight apparatus which has all the advantages of the prior art boat lighting apparatus and none of the disadvantages.

It is another object of the present invention to provide a new and improved boat spotlight apparatus which may further allow for autonomous tracking of a selected object to correct for motion imparted by marine conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a perspective view of an illumination element 22 for use in conjunction with a motion stabilized search light according to a preferred embodiment of the present invention;

FIG. 2 is a partial exploded perspective view thereof;

FIG. 3 is a front elevational view thereof;

FIG. 4 is a side elevational view thereof;

FIG. 5 is a schematic diagram of a motion stabilized search light according to a preferred embodiment of the present invention;

DESCRIPTION OF THE PREFERRED EMBODIMENTS

Figure 6:
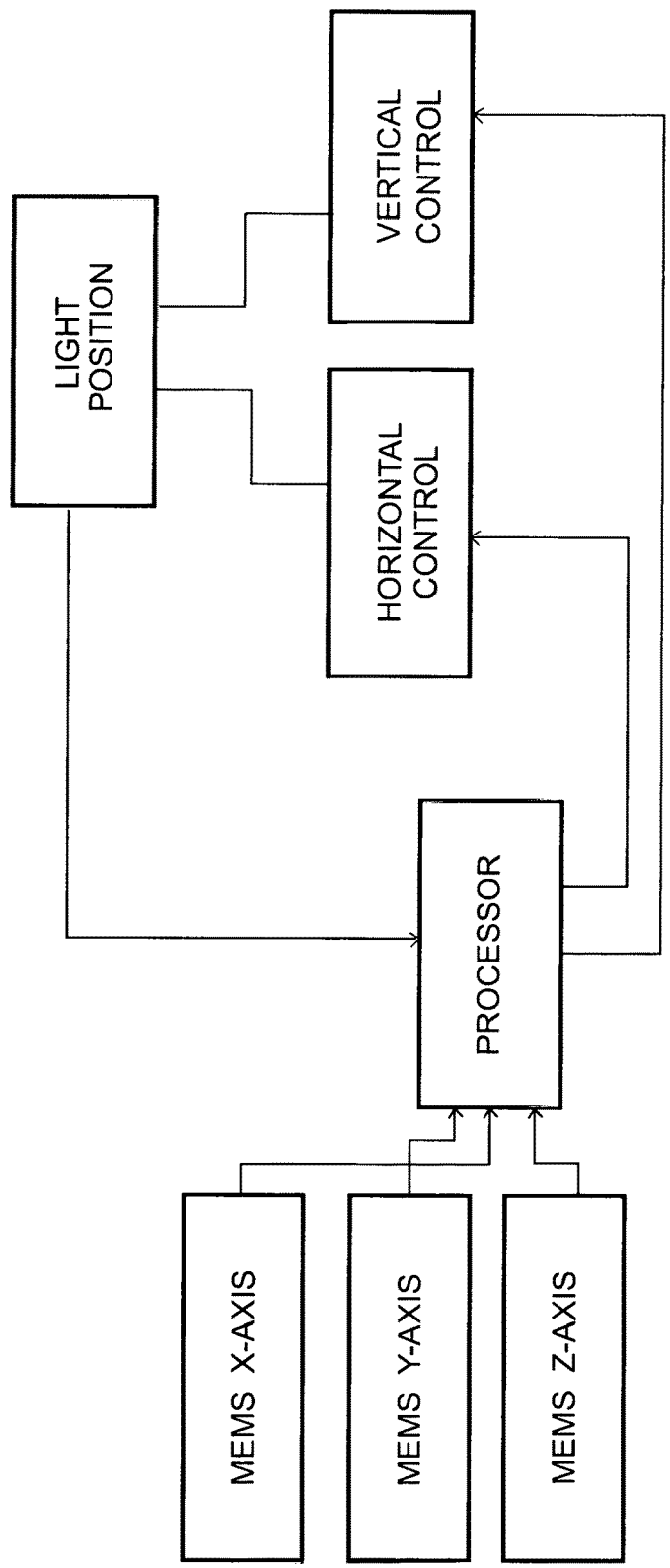
FIG. 6 is a is a schematic diagram depicting autonomous spotlight control in accordance with embodiments of the present invention.
Figure 7:
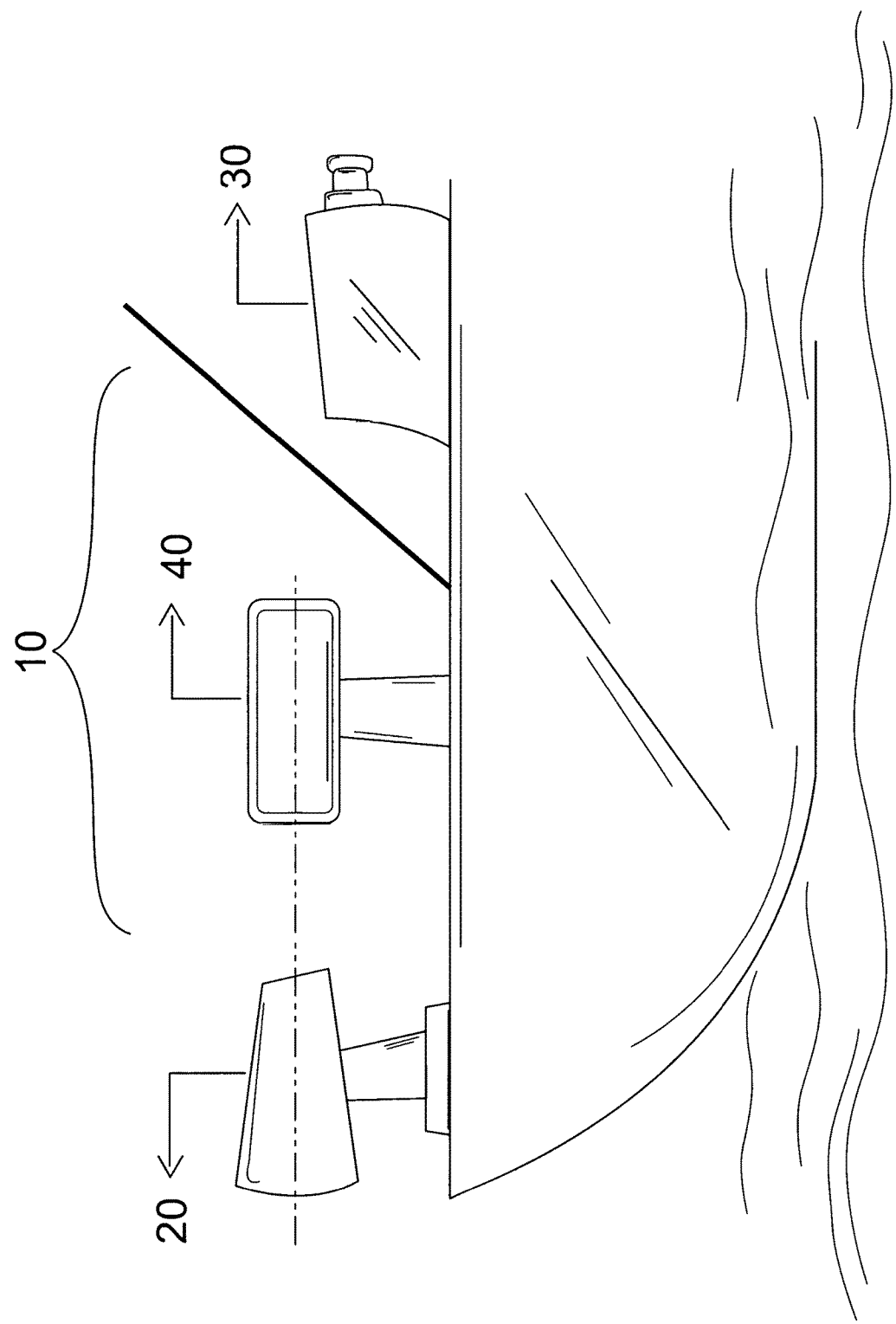
FIG. 7 is a partial side elevational view of the motion stabilized search light according to the preferred embodiment of the present invention install in an exemplary use with a boat.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

With reference now to the drawings, a new and improved boat spotlight apparatus embodying the principles and concepts of the present invention and generally designated by the references numeral 10 is provided. The boat spotlight apparatus 10 essentially comprises an illumination element 20, a remote control 30, and an electronic position sensor 40.

The illumination element 20 is intended to include an illumination head 22 forming a housing mounted to a pedestal 24. The housing 22 has a lens element 25 covering one face and containing one or more lights 26. The lights 26 are understood to be one or more light emitting diodes that when in use may function as a spotlight member as a running light and as a spotlight for manual manipulation during night fishing or other similar tasks. The pedestal 24 is intended to mount to the deck or other structure of a boat, or similar equivalent for another vehicle. A lower flange element 27 may be used to affix and retain the pedestal 24 to such structures.

The illumination head 22 is mounted to the upper end of the pedestal 24 in a manner that provides lateral movement and vertical movement. A rotational motor element 50 links the uppermost end of the pedestal 24 to the illumination head 22 in a manner that provides rotational motion in a remotely operated manner. A servo motor or similar or equivalent electromechanical operator may provide 360° rotational positioning side to side relative to the structure upon which it is mounted. Additionally, a pivoting motor 52 provides a pivoting, up and down articulation of the illumination head 22 in a manner that may be remotely operated. A servo motor or similar or equivalent electromechanical operator may pivoting positioning up and down relative to the structure upon which it is mounted. While various ranges of pivoting motion may be desirable for various operations, it is felt that a 45° or 90° pivoting range (+/−22.5° or +/−45° range) would be sufficient for many or most applications.

The combination of motion control to control oscillation and rotation of the illumination head drive cam, wherein drive linkage 40 eccentric mounting to the may provide a tracking effect to the illumination head 22 during operation, such as when in use in a fishing scenario.

Both the lateral as well as the vertical motions of the illumination head 22 may be control by the remote control 30. Using a joystick 32 or other user input device, the spotlight 20 may be controlled and positioned toward a directed target. An on/off switch 34 effects operation of the positioning of the illumination head 22 through electrical communication mechanism, shown herein as a hard-wired control cord 36 in electrical communication with the motors 50, 52 respectively. The electrical communication mechanism 36 permits remote manual manipulation of the illumination head 22 via the joystick 32. As should become apparent by those having ordinary skill in the relevant art, in light of the present teachings, the implementation and use of a wireless communication mechanism may be equivalently implemented for control of the illumination head 22 via the joystick 32.

In conjunction with the remotely operated positioning of the illumination head 22, an electronic position sensor 40 is intended to be in operational communication with the boat spotlight apparatus 10. The positioning sensor 40 may include any number of microelectromechanical system (MEMS) devices include miniature accelerometers, angular rate sensors, gyroscopes, etc., which may be combined to form a MEMS inertial measurement unit (IMU). MEMS gyroscopes offer low cost, compact size, low weight, and low power consumption, but are far less accurate than fiber-optic or ring-laser gyros. As shown in conjunction with FIG. 6, a plurality of relatively inexpensive positioning sensors, such as, for example, a MEMS gyroscope 40, provide measurements of latitude, longitude and elevation, respectively. A processor 60 and a memory 62 that stores a set of machine readable instructions executable by the processor 60 to process latitude and longitude measurements, received from the sensors, in order to accurately determine latitude, longitude and elevation. In other embodiments, additional navigation sensors may be included, such as, for example, a MEMS Inertial Measurement Unit (IMU), an altitude sonar and bathymetric database, a Global Positioning System (GPS), etc.

The processor 60 is coupled to the MEMS gyroscope 40, as well as to the memory 62. The processor 60 is also coupled to an I/O port in order to communicate with other components or subsystems of the vehicle, such as, for example, a guidance and control subsystem, a communications subsystem, a payload, etc. Alternatively, processor 60 may perform various aspects of these subsystem functionalities, such as, for example, guidance and control, etc.

2. Operation of the Preferred Embodiment

As to the manner of usage and operation of the instant invention, the same should be apparent from the above disclosure, and accordingly no further discussion relative to the manner of usage and operation of the instant invention shall be provided. The illumination head 22 may be activated and directed to be trained upon a designated target. Initial target acquisition may be provided by manipulation of the joystick 32. Once the target is illuminated, an autonomous select target tracking mode may be engaged by activating a motion correction processing system described above. In an intended application for use with a boat, there are six degrees of freedom that a ship, boat or other craft can experience. These include linear motions of heave (up/down), sway (side-to-side or port-starboard), and surge (front/back or bow/stern) motions imparted by maritime conditions. Additionally, rotational motions such a pitch (up/down rotation of a vessel about its side-to-side or port-starboard axis, roll (tilting rotation of a vessel about its front-back or bow-stern axis, and yaw (turning rotation of a vessel about its vertical axis) must all be corrected to offset motions imparted by the maritime conditions upon the vessel in order to keep an intended target within the direction of the spotlight. Such corrections may be process and implemented in the form of a control adjustment to move the illumination head 22 to maintain illumination on a desired target.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar case-law or subsequent precedent should not be made if any future claims are added or amended subsequent to this Patent Application.

What is claimed is:

1. A boat spotlight apparatus in combination with a marine vessel, wherein the apparatus comprises:
    a boat spotlight apparatus having at least one illumination element, a rotational lateral control mechanism, and a pivoting vertical control mechanism;
    a remote control in operative communication with said rotational lateral control mechanism and said pivoting vertical control mechanism;
    a MEMS gyroscope position sensor adapted to identify a motion of said boat spotlight apparatus relevant a selected target of said boat spotlight apparatus; and
    a processor for calculating and controlling an autonomous select target tracking subject to an input form said electronic positioning sensor and a targeted direction of said boat spotlight apparatus;
    said MEMS gyroscope position sensor provides measurements of latitude, longitude and elevation, respectively to said processor and a memory that stores a set of machine readable instructions executable by the processor to process latitude and longitude measurements, received from the MEMS gyroscope position sensor, in order to accurately determine latitude, longitude and elevation and control a position of said boat spotlight apparatus to control oscillation and rotation of the illumination to provide a tracking effect to the illumination head during operation.

2. The boat spotlight apparatus in combination with a marine vessel of claim 1, wherein said illumination element comprises:
    an illumination head forming a housing mounted to a pedestal;
    a lens element covering one face of said housing and containing one or more light emitting diodes;
    said pedestal having an upper end opposite a lower end, said lower end for affixing and retaining the pedestal to a structure;
    said illumination head mounted to the upper end of the pedestal in a manner that provides lateral movement and vertical movement.

3. The boat spotlight apparatus in combination with a marine vessel of claim 2, further comprising:

a rotational motor element linking the uppermost end of the pedestal to the s illumination head in a manner that provides rotational motion in a remotely operated manner; and an electromechanical operator to provide 360° rotational positioning of said illumination head relative to said pedestal.

\* \* \* \* \*